(12) United States Patent
Iyer et al.

(10) Patent No.: US 10,688,970 B2
(45) Date of Patent: Jun. 23, 2020

(54) METHOD OF DISTRIBUTING AIR VENTILATION IN A VEHICLE

(71) Applicant: Hanon Systems, Daejeon (KR)

(72) Inventors: Jayanthi R. Iyer, Northville, MI (US); Eric Haupt, Livonia, MI (US); Dennis Vermette, Westland, MI (US); Jim Nolta, Canton, MI (US); Shankar Patil, Novi, MI (US); Mark Douglas Conley, Canton, MI (US)

(73) Assignee: HANON SYSTEMS, Daejeon (KR)

( * ) Notice: Subject to any disclaimer, the term of this patent is extended or adjusted under 35 U.S.C. 154(b) by 527 days.

(21) Appl. No.: 15/293,790

(22) Filed: Oct. 14, 2016

(65) Prior Publication Data
US 2018/0105147 A1    Apr. 19, 2018

(51) Int. Cl.
*B60S 1/54* (2006.01)
*B60S 1/58* (2006.01)
*B60H 1/00* (2006.01)
*F25D 21/12* (2006.01)

(52) U.S. Cl.
CPC ............ *B60S 1/54* (2013.01); *B60H 1/00678* (2013.01); *B60H 1/00835* (2013.01); *F25D 21/125* (2013.01)

(58) Field of Classification Search
CPC ............ B60H 1/00678; B60H 1/00835; F25D 21/125
USPC .......................................... 454/123, 155, 156
See application file for complete search history.

(56) References Cited

U.S. PATENT DOCUMENTS

| | | | |
|---|---|---|---|
| 4,741,258 A * | 5/1988 | Trube | B60H 1/242 454/127 |
| 8,511,371 B2 * | 8/2013 | Onda | B60H 1/00685 165/202 |
| 2010/0178861 A1 * | 7/2010 | Sano | B60H 1/00028 454/127 |

(Continued)

FOREIGN PATENT DOCUMENTS

| DE | 69503564 T2 | 3/1999 |
|---|---|---|
| DE | 10051195 A1 | 5/2001 |

(Continued)

OTHER PUBLICATIONS

German Office Action dated Apr. 27, 2020.

*Primary Examiner* — Helena Kosanovic
(74) *Attorney, Agent, or Firm* — Shumaker, Loop & Kendrick, LLP; James D. Miller

(57) ABSTRACT

An air-handling system for a heating, ventilation, and air conditioning system of a vehicle includes a main housing comprising a conditioning section, a mixing section, and a delivery section having a flow of air passing therethrough. The delivery section includes a conduit branching into a windshield defrost pathway and a demist pathway, the windshield defrost pathway leading to windshield defrost vents of a passenger compartment of the vehicle and the demist pathway leading to side window defrost vents of the passenger compartment. A control door rotatably disposed in the conduit is adjustable through a range of rotational positions wherein a flow area through the windshield defrost pathway is variably restricted while the demist pathway remains unobstructed. The control door is further adjustable to a position wherein the windshield defrost pathway and the demist pathway are closed.

7 Claims, 5 Drawing Sheets

(56) References Cited

U.S. PATENT DOCUMENTS

2013/0288586 A1* 10/2013 Jang .................. B60H 1/00678
454/152
2015/0306935 A1 10/2015 Shichiken et al.

FOREIGN PATENT DOCUMENTS

| JP | 10-166838 A | 6/1998 |
| JP | 2016088141 A | 5/2016 |

* cited by examiner

METHOD OF DISTRIBUTING AIR VENTILATION IN A VEHICLE

FIELD OF THE INVENTION

The invention relates to a climate control system for a vehicle, and more particularly to a climate control system for a heating, ventilating, and air conditioning system for the vehicle.

BACKGROUND OF THE INVENTION

A vehicle typically includes a climate control system which maintains a temperature within a passenger compartment of the vehicle at a comfortable level by providing heating, cooling, and ventilation. Comfort is maintained in the passenger compartment by an integrated mechanism referred to in the art as a heating, ventilation and air conditioning (HVAC) air-handling system. The air-handling system conditions air flowing therethrough and distributes the conditioned air throughout the passenger compartment.

The air-handling system commonly employs a housing having a plurality of passageways and doors for controlling a temperature and a flow of the air therethrough. The housing may for example be divided into an inlet section, a conditioning section, a mixing section, and a delivery section. The inlet section may include a blower or fan for delivering the air to the conditioning section. The conditioning section includes one or more heat exchangers for controlling a temperature of the air, wherein temperature doors or similarly actuated control devices disposed within the conditioning section control the flow of the air through passageways having the heat exchangers disposed therein. The mixing section is disposed downstream of the conditioning section and forms a chamber for recombining each of the streams of air, whether heated or cooled, exiting the conditioning section. The delivery section includes a plurality of conduits or ducts branching from the mixing section for delivering the air to the desired vents located within the passenger compartment of the vehicle.

The vents disposed within the passenger compartment may include panel vents, console vents, front floor vents, rear floor vents, windshield defrost vents, and side window defrost vents, for example. The delivery section is configured to deliver the air originating from the mixing section to any combination of the vents based on the operating mode selected by a passenger of the vehicle. Each operating mode includes a preselected percentage of the air originating from the mixing section delivered to each of the corresponding vents associated with the selected operating mode. Doors disposed within the delivery section, which may alternatively be referred to as flaps or valves, may be actuated to control the distribution of the air to each of the desired vents by blocking or opening various passageways disposed within the delivery section. For example, a "panel operating mode" may include the air distributed only to the panel vents and the console vents, a "defrost operating mode" may include the air distributed only to the windshield defrost vents and the side window defrost vents, and a "floor operating mode" may include the air distributed to each of the front floor vents, the rear floor vents, the windshield defrost vents, and the side window defrost vents.

One problem associated with the distributing of the air to each of the vents of the delivery section is related to differences in a volumetric flow rate and pressure of the air required at the outlet of each of the vents to achieve the desired distribution of the air for each of the operating modes. Because each of the vents of the delivery section receive air from the mixing section wherein the air has a common pressure value, each portion of the delivery section fluidly coupling the mixing section to a corresponding vent must be constructed or otherwise controlled to cause a desired pressure drop in the air to meet the desired conditions at the outlet of each of the vents. One method of controlling the pressure drop is to variably restrict or open one or more flow paths through which the air passes for a given operating mode. The variable restriction or opening of the flow paths may be achieved by actuating one or more doors disposed within the flow paths to control the pressure and flow rate of the air through each of the flow paths.

The problem associated with the control of the flow of the air through each independent flow path is especially evident when attempting to control the pressure of the air associated with the outlets of the windshield defrost vents and the outlets of the side window defrost vents. It is common for the flow path leading to the windshield defrost vents and the flow path leading to the side window defrost vents to branch from a common portion of the delivery section due to these vents commonly being used together during various operating modes of the air handling system. For example, the flow path leading to the windshield defrost vents and the flow path leading to the side window defrost vents may each branch from a defrost cavity of the delivery section separated from the mixing section by an actuated door. Upon opening the door, air from the mixing section flows into the defrost cavity before branching to one or both of the windshield defrost vents and the side window defrost vents. In certain operating modes of the air handling system, a pressure required at the outlet of each of the windshield defrost vents to achieve a desired volumetric flow rate of the air through the windshield defrost vents may differ in comparison to a pressure required at the outlet of each of the side window defrost vents to achieve a desired volumetric flow rate of the air through each of the side window defrost vents.

For example, when operating in the floor operating mode, the windshield defrost vents may require a duct pressure of about 5 PA to deliver the air out of the windshield defrost vents at a volumetric flow rate of about 30-40 $m^3/h$ whereas the side window defrost vents may require a duct pressure of about 175 PA to deliver the air out of the side window defrost vents at the same volumetric flow rate of about 30-40 $m^3/h$. In contrast, when operating in the defrost operating mode, the windshield defrost vents and the side window defrost vents may each require approximately the same duct pressure of about 225 PA to deliver the air out of the windshield defrost vents and the side window defrost vents at their required volumetric flow rates of about 250-325 $m^3/h$ and 35-45 $m^3/h$, respectively. Accordingly, the variation in pressure required in each of the respective passageways frustrates an attempt to simultaneously control the pressure within each passageway by actuating the door disposed upstream of the defrost chamber, as an attempt to control the pressure in one of the flow paths will also affect the ability to control the pressure in the other of the flow paths.

This problem is further evident in view of changing demands in the distribution of the air to the various vents of the passenger compartment based on the corresponding operating mode, and especially changing demands to the percentage of the air delivered to the side window defrost vents during the floor operating mode, the defrost operating mode, and a mixed floor/defrost operating mode. For example, in traditional air handling systems the floor operating mode may include about 75% of the air delivered to the floor vents, about 17% of the air delivered to the windshield defrost vents, and about 8% of the air delivered to the side window defrost vents. The traditional mixed floor/defrost operating mode may include about 56% of the air delivered to the floor vents, about 34% of the air delivered to the windshield defrost vents, and about 10% of the air delivered to the side window defrost vents. The traditional defrost operating mode may include none of the air delivered to the floor vents, about 80% of the air delivered to the windshield defrost vents, and about 20% of the air delivered to the side window defrost vents.

In contrast, newer air distribution requirements require the distribution of the air to the side window defrost vents to be elevated while also remaining substantially constant throughout the different operating modes utilizing the side window defrost vents. For example, the new requirements for air distribution during the floor operating mode may include about 72% of the air delivered to the floor vents, about 10% of the air delivered to the windshield defrost vents, and about 18% of the air delivered to the side window defrost vents. The new requirements for the mixed floor/defrost operating mode may include about 56% of the air delivered to the floor vents, about 30% of the air delivered to the windshield defrost vents, and about 14% of the air delivered to the side window defrost vents. The new requirements for the defrost operating mode may include none of the air delivered to the floor vents, about 80% of the air delivered to the windshield defrost vents, and about 20% of the air delivered to the side window defrost vents. Accordingly, in contrast to the traditional requirements wherein the percentage and/or the airflow volume of the air distributed to the side window defrost vents more than doubled between the floor operating mode and the defrost mode, the new requirements include the percentage and/or the airflow volume of the air distributed to the side window defrost vents remaining substantially constant throughout all three of the operating modes including a defrost function. This relationship presents a situation wherein the pressure at the outlets of the side window defrost vents must remain substantially similar for all three operating modes whereas the pressure at the outlets of the windshield defrost vents must vary significantly depending on the selected operating mode.

One solution to the differing pressure requirements between the windshield defrost vents and the side window defrost vents is to provide a separate door for controlling entry into each flow path branching from the defrost chamber. However, this solution may require the addition of multiple components such as doors, actuators, links, or control elements, thereby increasing a cost and complexity to manufacture the air handling system.

The variation in the distribution of the air for the various different operating modes to the windshield defrost vents and the side window defrost vents also poses additional problems relating to the noise, vibration, and harshness (NVH) generated by the flow of the air while flowing through the delivery section. The windshield defrost vents and the side window defrost vents may typically require a relatively small percentage of the air flowing through the mixing section distributed thereto for various operating modes. This leads to situations wherein a restriction of the flow area into either of the windshield defrost pathway or the side window defrost pathway formed in the delivery section may be required to control the distribution of the flow of the air to the corresponding vents. These conditions may result in a situation where the air delivered to either of the windshield defrost vents or the side window defrost vents must travel through a relatively small gap while passing from a high pressure chamber (the mixing section) to a relatively low pressure chamber (either of the windshield defrost pathway or the side window defrost pathway), thereby resulting in a rapid expansion of the air in a manner that may cause undesirable NVH.

Accordingly, there exists a need in the art to efficiently and cost effectively control a distribution of air to the windshield defrost vents and the side window defrost vents of an air handling system while preventing an incidence of noise, vibration, and harshness.

SUMMARY OF THE INVENTION

Concordant and consistent with the present invention, an efficient and lost cost method of controlling a flow of air to windshield defrost vents and side window defrost vents of a passenger compartment by adjusting a position of a control door has surprisingly been discovered.

In one embodiment of the invention, an air handling system for a heating, ventilation, and air conditioning system of a motor vehicle having a passenger compartment comprises a conduit having a flow of air passing therethrough. The conduit includes a partition dividing the conduit into a first pathway and a second pathway. A control door is disposed in the conduit and is rotatably adjustable between a first position wherein the first pathway and the second pathway are each fully open and a second position wherein a flow area through the first pathway is at least partially restricted and the second pathway is fully open.

According to another aspect of the invention, a method of operating an air handling system of a vehicle having a mixing section for receiving a flow of air and a delivery section for distributing the flow of air to vents of a passenger compartment of the vehicle is disclosed. The method comprises the steps of: providing a conduit forming a portion of the delivery section downstream of the mixing section with respect to a direction of the flow of the air, the conduit branching into a first pathway and a second pathway; and adjusting a control door to control the flow of air through the first pathway and the second pathway.

BRIEF DESCRIPTION OF THE DRAWINGS

The above, as well as other advantages of the present disclosure, will become readily apparent to those skilled in the art from the following detailed description, particularly when considered in the light of the drawings described hereinafter.

DETAILED DESCRIPTION OF THE INVENTION

Figure 1:
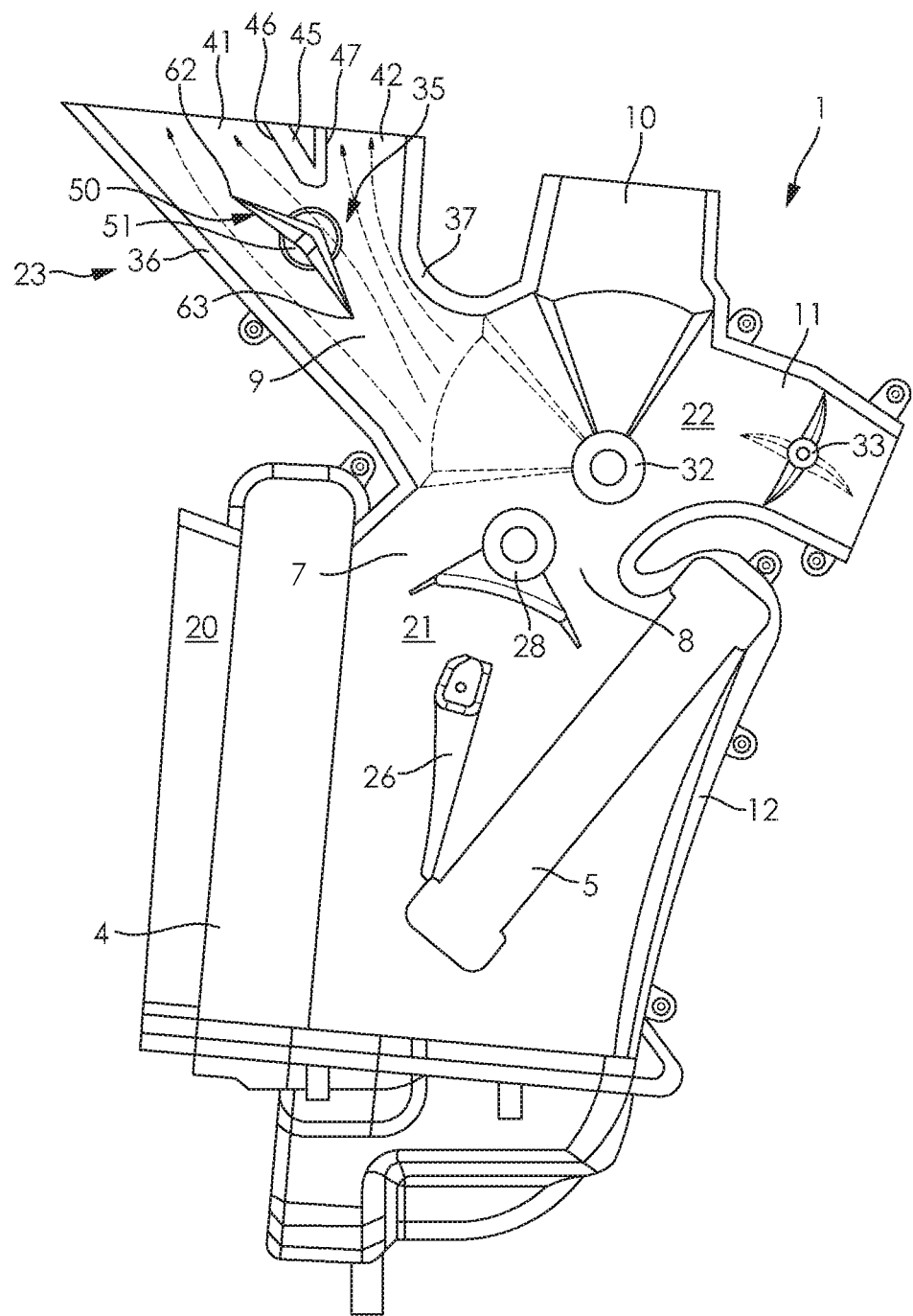
FIG. 1 is an elevational view showing an interior of a main housing of an air handling system according to an embodiment of the invention, the air handling system including a conduit having a control door adjusted to a position corresponding to a defrost operating mode of the air handling system.

The following detailed description and appended drawings describe and illustrate various embodiments of the invention. The description and drawings serve to enable one skilled in the art to make and use the invention, and are not intended to limit the scope of the invention in any manner. In respect of the methods disclosed, the steps presented are exemplary in nature, and thus, the order of the steps is not necessary or critical.

FIGS. 1-6 illustrate an air-handling system 1 of a heating, ventilating, and air conditioning (HVAC) system for a vehicle (not shown) according to an embodiment of the invention. As used herein, the term air can refer to fluid in a gaseous state, fluid in a liquid state, or any combination thereof. The air-handling system 1 typically provides heating, ventilation, and air conditioning for a passenger compartment (not shown) of the vehicle.

The air-handling system 1 includes a hollow main housing 12. The main housing 12 may be formed by the cooperation of a pair of housing shells (not shown). The housing shells may interface with each other along peripheral regions thereof to form the hollow main housing 12. The main housing 12 may be formed from plastic, but other materials can be used, as desired. In other embodiments, the main housing 12 may be formed by the cooperation of three or more separately formed components or housing portions, as desired.

FIGS. 1-4 illustrate a hollow interior of the main housing 12 with one of the two housing shells cooperating to form the main housing 12 removed to better illustrate the internal components thereof. The main housing 12 includes an inlet section 20, a conditioning section 21, a mixing section 22, and a delivery section 23. The inlet section 20 receives a supply of air and may include a blower or fan (not shown) for causing the supply of the air to flow to the conditioning section 21. The supply of the air can be provided from outside of the vehicle, recirculated from the passenger compartment of the vehicle, or a mixture of the two, for example. If desired, a filter (not shown) can be provided upstream or downstream of the inlet section 20 to filter out debris or contaminants carried by the supply of air.

The conditioning section 21 may include an evaporator core 4 and a heater core 5. The evaporator core 4 may form a portion of a primary refrigerant circuit of the air conditioning system associated with the air handling system 1. The evaporator core 4 is configured to exchange heat energy between the flow of air and the refrigerant flowing through the evaporator core 4 to cool and/or dehumidify the flow of air. Although described as an evaporator core, it should be understood that any form of cooling device in heat exchange relationship with any device or system of the motor vehicle may be employed for use with the air handling system 1 without departing from the scope of the present invention. The heater core 5 may form a radiator associated with a coolant circuit used to cool an engine of the motor vehicle. The heater core 5 is further configured to exchange heat energy between the flow of air and a coolant circulated through the coolant circuit to heat the flow of air. Alternatively, the heater core 5 may be in heat exchange relationship with a fluid used to cool a battery or other heat producing device associated with the motor vehicle or the heater core 5 may be a heating device configured to produce heat using an electrical source. It should be understood that any form of heating device suitable for heating a flow of air therethrough may be used in place the heater core 5 without departing from the scope of the present invention.

As shown in FIG. 1, the evaporator core 4 may be disposed at an inlet region of the conditioning section 21 immediately downstream of the inlet section 20. The evaporator core 4 extends across an entirety of a flow area at the inlet region of the conditioning section 21 to cause the entirety of the flow of air to pass through the evaporator core 4, thereby cooling and/or dehumidifying the entirety of the flow of the air when entering the conditioning section 21.

After flowing through the evaporator core 4, the flow of the air encounters a baffle wall 26. A cold air passageway 7 is formed to one side of the baffle wall 26 and a warm air passageway 8 is formed to a second side of the baffle wall 26. The warm air passageway 8 includes the heater core 5 disposed therein. The heater core 5 may be disposed across an entirety of a flow area of the warm air passageway 8, as desired. In other embodiments, only a portion of the flow area of the warm air passageway is covered by the heater core 5, as desired.

A temperature door 28 is rotatably coupled to the main housing 12 at a downstream end of each of the cold air passageway 7 and the warm air passageway 8. The temperature door 28 may be positioned in a first position wherein the temperature door 28 is rotated to block passage of the flow of air through the warm air passageway 8 and into the mixing section 22. When the temperature door 28 is in the first position the entirety of the flow of air is directed through the opened cold air passageway 7 and into the mixing section 22 immediately after flowing through the evaporator core 4. The temperature door 28 may alternatively be positioned in a second position wherein the temperature door 28 is rotated to block passage of the flow of air through the cold air passageway 7 and into the mixing section 22. When the temperature door 28 is in the second position the entirety of the flow of air is directed through the opened warm air passageway 8 and into the mixing section 22 immediately after flowing through the heater core 5. The temperature door 28 may alternatively be rotated to an intermediate position between the first position and the second position, as shown in FIG. 1. When in the intermediate position, a first partial air flow of the flow of air may flow through the cold air passageway 7, past the temperature door 28, and into the mixing section 22 while a second partial air flow of the flow of air may flow through the warm air passageway 8 including passing through the heater core 5, past the temperature door 28, and into the mixing section 22. The first partial air flow and the second partial air flow are then recombined and mixed in the mixing section 22. As should be understood, the temperature door 28 may be adjustable to a variety of intermediate positions to control a percentage of the flow of air passing through the cold air passageway 7 and the warm air passageway 8, respectively, to control a temperature of the flow of air according to desired temperature settings of a passenger within the passenger compartment of the motor vehicle.

The entirety of the flow of air exiting the conditioning section 21 is caused to flow into the mixing section 22 before being distributed through the delivery section 23. The mixing section 22 accordingly acts as a common source of air having a substantially uniform pressure for distribution to each of the conduits or ducts of the delivery section 23. As such, it should be understood that alternative configurations of the inlet section 20 and the conditioning section 21 may be used without departing from the scope of the invention so long as the various conduits forming the delivery section of the corresponding air handling system branch from a mixing section forming a common source of the air to be distributed. Accordingly, the associated air handling system may include a different configuration of the heat exchangers, flow passageways, or doors used to control the flow of the air upstream of the mixing section 22 without departing from the scope of the present invention. The conditioning section of the air handling system may for example be similar to that described in any of U.S. Pat. No. 7,878,235 to Park et al., U.S. Pat. No. 8,757,245 to Richter et al., and U.S. Pat. No. 8,840,452 to Han, as non-limiting examples.

The delivery section 23 of the main housing 12 illustrated in FIG. 1 includes a first conduit 9, a second conduit 10, and a third conduit 11. The first conduit 9 fluidly couples the mixing section 22 to one or more windshield defrost vents (not shown) and one or more side window defrost vents (not shown), wherein the side window defrost vents may also commonly be referred to as the "demist" vents of the air handling system 1. The second conduit 10 fluidly couples the mixing section 22 to one or more panel vents (not shown) and one or more console vents (not shown). The third conduit 11 fluidly couples the mixing section 22 to one or more front floor vents (not shown) and one or more rear floor vents (not shown). However, it should be understood that various other configurations of the second conduit 10 and the third conduit 11 leading to various different vents of the air handling system 1 may be used without departing from the scope of the present invention.

A first mode door 32 is rotatably coupled to the main housing 12 within the mixing section 22. The first mode door 32 may be positioned in a first position wherein the first mode door 32 is rotated to block passage of the flow of the air into the second conduit 10. When in the first position, the flow of the air is distributed between one or both of the first conduit 9 and the third conduit 11. The first mode door 32 rotated to the first position may correspond to one of a defrost operating mode, a floor operating mode, and a mixed defrost/floor operating mode. The first mode door 32 may alternatively be positioned in a second position wherein the first mode door 32 is rotated to block passage of the flow of air into the first conduit 9. When in the second position, the flow of the air is distributed between one or both of the second conduit 10 and the third conduit 11. The first mode door 32 rotated to the second position may correspond to a panel vent operating mode or a mixed panel vent/floor vent operating mode. The first mode door 32 may also be rotated to a plurality of intermediate positions between the first position and the second position. The first mode door 32 may be rotated to one of the intermediate positions when a mixed operating mode of the air handling system 1 is selected by the passenger requiring a flow of the air to each of the first conduit 9 and the second conduit 10.

The third conduit 11 includes a second mode door 33 disposed therein and rotatably coupled to the main housing 12. The second mode door 33 may be adjustable between a first position wherein the second mode door 33 is perpendicular to and blocking the flow path formed through the third conduit 11 and a second position wherein the second mode door 33 is parallel to and opening the flow path formed through the third conduit 11. The second mode door 33 may also be adjusted to an intermediate position between the first position and the second position. The second mode door 33 is adjusted between the first position, the intermediate positions, and the second position depending on the operating mode of the air handling system 1, and more specifically, the second mode door 33 is adjusted to an intermediate position or the second position when the floor vents of the air handing system 1 are required for the selected operating mode.

The first conduit 9 forms a defrost cavity 35 of the delivery section 23. The defrost cavity 35 may be defined as a portion of the first conduit 9 formed downstream of the mixing section 22 and upstream of a windshield defrost pathway 41 leading to the windshield defrost vents of the air handling system 1 and a demist pathway 42 leading to the side window defrost vents of the air handling system 1. The windshield defrost pathway 41 and the demist pathway 42 branch from the defrost cavity 35 and are separated from each other by a partition 45. The partition 45 may form a portion of the main housing 12 extending into the defrost cavity 35. A first side 46 of the partition 45 defines at least a portion of the windshield defrost pathway 41 and a second side 47 of the partition defines at least a portion of the demist pathway 42. The defrost cavity 35 is further defined by a first sidewall 36 of the main housing 12 and a second sidewall 37 of the main housing 12. A first portion of the first sidewall 36 disposed in the defrost cavity 35 is in facing relationship with a first portion of the second sidewall 37 also disposed in the defrost cavity 35. A second portion of the first sidewall 36 extends into the windshield defrost pathway 41 and is in facing relationship with the first side 46 of the partition 45. A second portion of the second sidewall 37 extends into the demist pathway 42 and is in facing relationship with the second side 47 of the partition 45. The mixing section 22, the defrost cavity 35, the windshield defrost pathway 41, and the demist pathway 42 also include a third sidewall 38 and a fourth sidewall 39 (each illustrated in FIG. 5) extending substantially perpendicular to each of the first sidewall 36, the second side wall 37, the first side 46 of the partition 45, and the second side 47 of the partition 45. The third sidewall 38 and the fourth sidewall 39 according extend along a pair of spaced apart planes substantially parallel to the page as shown in FIGS. 1-4.

Figure 6:
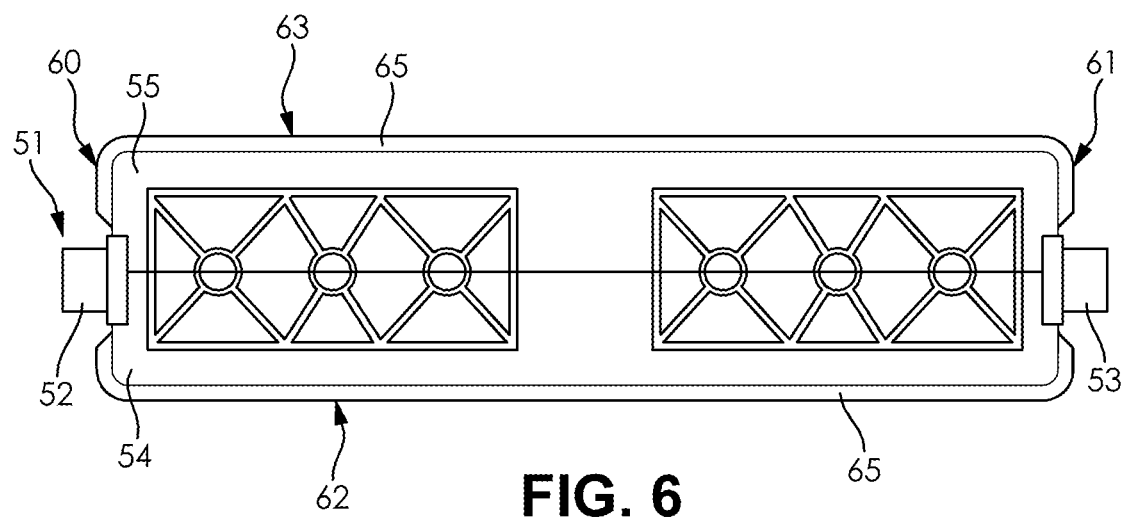
FIG. 6 is an elevational view of the control door illustrated in FIGS. 1-5.

A control door 50 is rotatably disposed in the defrost cavity 35. As shown in FIG. 6, the control door 50 includes a shaft 51 forming an axis of rotation of the control door 50. The shaft 51 is shown in FIG. 6 as including a first shaft portion 52 disposed at a first end of the control door 50 and a second shaft portion 53 disposed at a second end of the control door 50. However, in other embodiments, the shaft 51 may be formed by a single structure extending from the first end to the second end of the control door 50. The first shaft portion 52 is rotatably coupled to the third sidewall 38 and the second shaft portion 53 is rotatably coupled to the fourth sidewall 39.

The control door 50 is shown in FIGS. 1-6 as having a dual panel construction including a substantially planar first panel 54 and a substantially planar second panel 55 oriented at an obtuse angle relative to the first panel 54. However, a single panel construction of the door having a substantially rectangular shape may be used without departing from the scope of the present invention. The control door 50 includes a first side edge 60, an oppositely arranged second side edge 61, a first distal edge 62, and an oppositely arranged second distal edge 63. The first side edge 60 extends along each of the first panel 54 and the second panel 55 and engages the third sidewall 38 of the main housing 12. The second side edge 61 extends along each of the first panel 54 and the second panel 55 and engages the fourth sidewall 39 of the main housing 12. The first distal edge 62 forms a distal surface of the first panel 54 formed to one side of the axis of rotation of the control door 50 while the second distal edge 63 forms a distal surface of the second panel 55 formed to a second side of the axis of rotation of the control door 50. The first distal edge 62 and the second distal edge 63 may each extend substantially parallel to the axis of rotation of the control door 50. The first side edge 60, the second side edge 61, the first distal edge 62, and the second distal edge 63 may include a sealing surface 65 such as an elastomeric sealing material disposed thereon for engaging the walls forming the main housing 12. The sealing surface 65 may be formed of any suitable material for engaging and forming a seal with portions of the air handling system 1, as desired. The sealing surface 65 may be configured to deflect or compress when engaging the corresponding surface of the main housing 12 to allow for the control door 50 to properly seal off a flow of air around the corresponding edge of the control door 50.

The control door 50 is shown and described as being substantially rectangular in shape, but the control door 50 may have any shape suitable for properly engaging the corresponding surfaces of the main housing 12. For example, if the first sidewall 36 were to have a substantially arcuate shape as the first sidewall 36 extends from the third sidewall 38 to the fourth sidewall 39, the corresponding distal edge 62, 63 of the control door 50 engaging the first sidewall 36 may have a corresponding arcuate shape. Additional shapes may also be used without departing from the scope of the present invention. Furthermore, the first distal edge 62 and the second distal edge 63 may be spaced different distances from the axis of rotation of the control door 50 depending on a configuration of the conduit 9. However, any suitable configuration may be used without departing from the scope of the present invention, so long as the control door 50 is dimensioned to engage the corresponding surfaces of the main housing 12 in accordance with the desired operation of the control door 50.

The shaft 51 and corresponding axis of rotation of the control door 50 is depicted in FIGS. 1-4 as being disposed immediately below the partition 45 in a position upstream of the windshield defrost pathway 41 and the demist pathway 42 and downstream of the mixing section 22. However, it should be understood by one skilled in the art that the size and positioning of the control door 50, the first sidewall 36, the second sidewall 37, and the partition 45 may be modified from that shown in FIGS. 1-5 to account for various different housing arrangements while still remaining within the scope of the present invention, so long as the resulting configuration is suitable for achieving the operating modes of the control door 50 in the manner as described hereinafter.

FIG. 1 illustrates the control door 50 when adjusted to a fully open position corresponding to the defrost operating mode of the air handling system 1. The fully open position refers to a position wherein the control door 50 is minimizing the restriction of flow caused by the presence of the control door 50 while maximizing the flow of the air past the control door 50. When in the defrost operating mode, the first mode door 32 may be positioned in the first position to block passage to the second conduit 10 and the second mode door 33 may be positioned in the first position to block flow into the third conduit 11.

The control door 50 is rotated to a position wherein both the windshield defrost pathway 41 and the demist pathway 42 are fully open to allow for a flow of the air from the mixing section 22 to flow to each of the windshield defrost vents and the demist vents of the air handling system. The control door 50 is rotated to a position substantially parallel to the flow of the air around the control door 50. The first distal edge 62 of the control door 50 is spaced apart from each of the first sidewall 36 and the first side 46 of the partition 45 and the second distal edge 63 of the control door 50 is spaced apart from each of the first sidewall 36 and the second sidewall 37. The first distal edge 62 may for example be spaced substantially equally from each of the first sidewall 36 and the partition 45 while the second distal edge 63 may be spaced substantially equally from each of the first sidewall 36 and the second sidewall 37. The positioning of the control door 50 directs a first partial flow of the air toward the windshield defrost pathway 41 and a second partial flow of the air in a direction toward the partition 45 to divide the second partial flow between the windshield defrost pathway 41 and the demist pathway 42.

The control door 50 when in the defrost operating mode is accordingly positioned to minimize a restriction of the flow of the air originating from the mixing section 22 and passing through the defrost cavity 35. The minimized restriction of the defrost cavity 35 causes the flow of the air to have a maximized pressure relative to the mixing section 22 when the flow of the air is distributed to each of the windshield defrost pathway 41 and the demist pathway 42, and subsequently the windshield defrost vents and the side window defrost vents.

Figure 2:
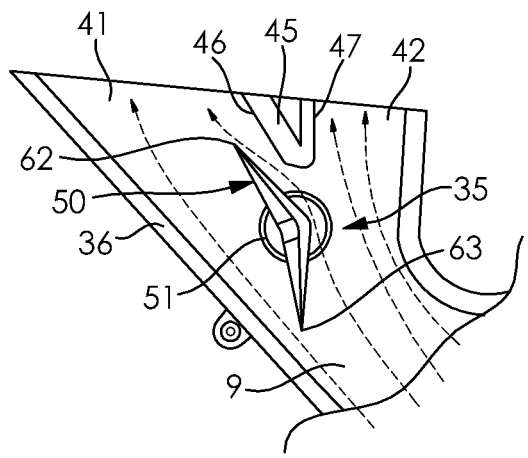
FIG. 2 is an elevational fragmentary view of the conduit and the control door of the air handling system illustrated in FIG. 1 wherein the control door is adjusted to a position corresponding to a mixed defrost/floor operating mode of the air handling system.

FIG. 2 illustrates the defrost cavity 35 when the air handling system 1 is operating in the mixed defrost/floor operating mode. The mixed defrost/floor operating mode may also include the second mode door 33 rotated to one of the intermediate positions or the second position to allow for at least a portion of the air originating from the mixing section 22 to flow through the third conduit 11 and to the floor vents of the air handling system 1.

The control door 50 is rotated from the position depicted in FIG. 1 about the axis of rotation of the control door 50 in a first rotational direction (a clockwise rotational direction from the perspective of FIGS. 1-4). Following the rotation, the control door 50 remains in a position wherein both the windshield defrost pathway 41 and the demist pathway 42 are at least partially open to allow for a flow of the air from the mixing section 22 to flow to each of the windshield defrost vents and the demist vents of the air handling system 1. However, in comparison to the position of the control door 50 when in the defrost operating mode as illustrated in FIG. 1, when in the mixed defrost/floor operating mode the first distal edge 62 is spaced apart from the first sidewall 36 by a greater distance, the first distal edge 62 is spaced apart from the first side 46 of the partition 45 by a smaller distance, the second distal edge 63 is spaced apart from the first sidewall 36 by a smaller distance, and the second distal edge 63 is spaced apart from the second sidewall 37 by a greater distance. Accordingly, the repositioning of the control door 50 results in the windshield defrost pathway 41 being restricted or lessened in a flow path cross-sectional area when compared to the positioning of the control door 50 shown in FIG. 1, while the demist pathway 42 remains unobstructed following the rotation of the control door 50. Furthermore, the control door 50 is angled in a manner wherein the partial air flow directed toward the partition 45 is not in any way restricted from entering the demist pathway 42, but is instead directed at least partially in a direction toward the demist pathway 42.

The control door 50 in the mixed defrost/floor operating mode is accordingly positioned to create a partial restriction of the windshield defrost pathway 41 while not acting to obstruct the demist pathway 42. This positioning accordingly allows for the air originating from the mixing section 22 to continue to flow to the side window defrost vents at a relatively high pressure substantially similar to that required when operating in the defrost operating mode, while the air flowing to the windshield defrost vents will have a lower pressure when compared to operation in the defrost operating mode. The partial restriction of the windshield defrost pathway 41 also reduces a percentage of the air originating from the mixing section 22 distributed to the windshield defrost vents in comparison to the percentage distributed to the windshield defrost vents when operating in the defrost operating mode.

Figure 3:
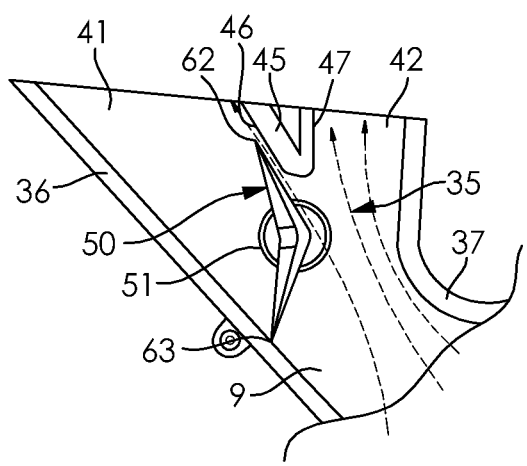
FIG. 3 is an elevational fragmentary view of the conduit and the control door of the air handling system illustrated in FIG. 1 wherein the control door is adjusted to a position corresponding to a floor operating mode of the air handling system.

FIG. 3 illustrates the defrost cavity 35 when the air handling system 1 is operating in the floor operating mode. The floor operating mode may also include the second mode door 33 rotated to the second position to allow for at least a portion of the air originating from the mixing section 22 to flow through the third conduit 11 and to the floor vents of the air handling system 1.

The control door 50 is further rotated from the position depicted in FIG. 2 about the axis of rotation of the control door 50 in the first rotational direction (clockwise from the perspective of FIGS. 1-4). In comparison to the position of the control door 50 when in the mixed defrost/floor operating mode as illustrated in FIG. 2, when in the floor operating mode the first distal edge 62 is spaced apart from the first sidewall 36 by a greater distance and the first distal edge 62 is spaced apart from the first side 46 of the partition 45 by a smaller distance. The second distal edge 63 engages the first sidewall 36 to block passage of the flow of the air past the second distal edge 63 and through to the windshield defrost pathway 41. Accordingly, the repositioning of the control door 50 results in the windshield defrost pathway 41 being restricted or lessened in a flow path cross-sectional area when compared to the position of the control door 50 shown in FIG. 2, while the demist pathway 42 continues to remain unobstructed. Furthermore, the control door 50 continues to be angled in a manner wherein the partial air flow directed toward the partition 45 is not in any way restricted from entering the demist pathway 42.

Figure 5:
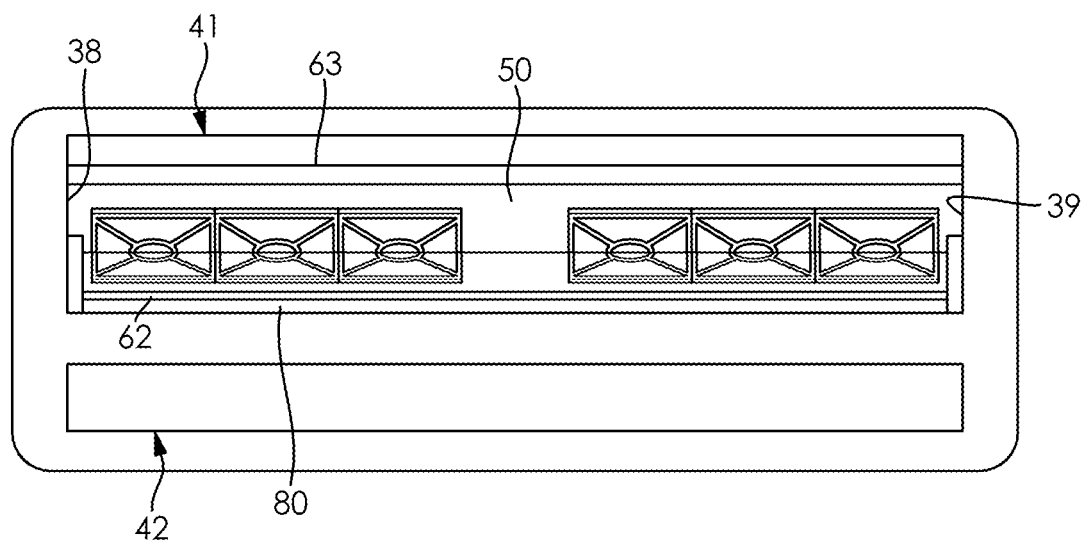
FIG. 5 is a partial perspective view of an outlet of the conduit showing a positioning of the control door when operating in the floor operating mode of the air handling system.

The flow of the air to the windshield defrost pathway 41 has accordingly been further restricted from the two flow path areas of the mixed defrost/floor operating mode to a single reduced flow path area, which is indicated in FIGS. 3 and 5 as gap 80. The flow of the air through the gap 80 may be referred to as a "bleed condition," wherein a relatively small percentage of the air originating from the mixing section 22 is caused to "bleed" between the first distal edge 62 of the control door 50 and the first side 46 of the partition 45.

The control door 50 in the floor operating mode is accordingly positioned to create an increased restriction of the windshield defrost pathway 41 while again not acting to obstruct the demist pathway 42. This positioning accordingly allows for the air originating from the mixing section 22 to continue to flow to the side window defrost vents at a relatively high pressure substantially similar to that required when operating in the defrost and mixed defrost/floor operating modes, while the air flowing to the windshield defrost vents will have a lower pressure when compared to operation in the defrost and mixed defrost/floor operating modes. The increased restriction of the windshield defrost pathway 41 further reduces the percentage of the air originating from the mixing section 22 distributed to the windshield defrost vents in comparison to the percentage of the air distributed to the windshield defrost vents when operating in the mixed defrost/floor operating mode.

Accordingly, the control door 50 may be rotated from a completely open position as illustrated in FIG. 1 to a position wherein the windshield defrost pathway 41 is almost entirely restricted (bleed condition) by rotating the control door 50 in the first rotational direction from the fully open position until rotation of the control door 50 is ceased by the engagement of the second distal edge 63 to the first sidewall 36. The rotation of the control door 50 in the first rotational direction allows for the windshield defrost pathway 41 to be variably restricted while the demist pathway 42 remains unobstructed.

The control door 50 has thus far been described as variably restricting only the windshield defrost pathway 41 while not obstructing the demist pathway 42, but the control door 50 is further configured to be rotatable to a position wherein the control door 50 blocks flow through the defrost cavity 35 in its entirety, thereby preventing flow through both of the windshield defrost pathway 41 and the demist pathway 42. With renewed reference to FIG. 1 showing the control door 50 when in an open position corresponding to the defrost operating mode, the control door 50 may be rotated from the position shown in FIG. 1 in a second rotational direction opposite the first rotational direction (counter-clockwise as shown in FIGS. 1-4). The control door 50 may be rotated in the second rotational direction until the first distal edge 62 engages the first sidewall 36 and the second distal edge 63 engages the second sidewall 37, thereby blocking flow to the defrost cavity 35 in its entirety. The control door 50 in the closed position may correspond to operation of the air handling system 1 in one of a panel operating mode or a bi-level panel/floor operating mode. The ability of the control door 50 to close off the defrost cavity 35 beneficially allows for the defrost cavity 35 to be closed off independent of a position of the first mode door 32. For example, the first mode door 32 may be rotated to one of the intermediate positions between the first conduit 9 and the second conduit 10 to reduce the percentage of the air originating from the mixing section 22 entering the second conduit 10 while increasing the percentage of the air originating from the mixing section 22 entering the third conduit 11. This may occur during a mixed panel/floor operating mode, for example. Such an operating mode does not typically utilize the windshield defrost vents or the side window defrost vents, hence it is important that the windshield defrost pathway 41 and the demist pathway 42 are both closed off regardless of the position of the first mode door 32.

The ability of the control door 50 to be rotated to the closed position also increases a flexibility of design of the air handling system 1 by removing the need for a door controlling entry into two or more conduits of the air handing system 1. For example, the first mode door 32 may be replaced with a mode door controlling flow only into the second conduit 10, thereby allowing for independent control of each of the conduits 9, 10, 11 with the same number of actuated doors. Furthermore, as explained hereinabove, the control door 50 may be adapted for use with any variety of air handling systems having a mixing section from which the delivery section branches to distribute the air to the various vents of the passenger compartment. Accordingly, in many alternative configurations of the mixing and delivery sections, the control door 50 may be required to be rotated to the closed position to control the flow of the air into the defrost cavity, as required by the structure of the associated air handling system.

Figure 4:
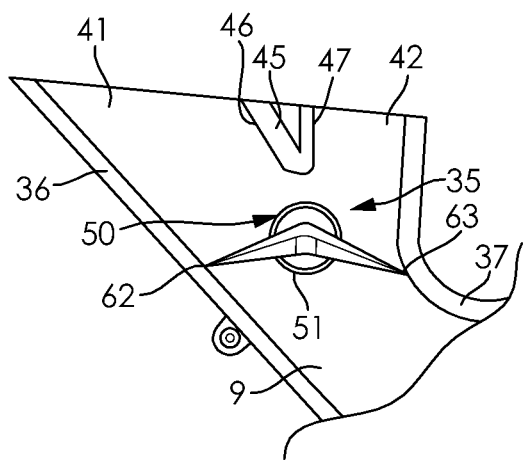
FIG. 4 is an elevational fragmentary view of the conduit and the control door of the air handling system illustrated in FIG. 1 wherein the control door is adjusted to a position wherein flow through the conduit is blocked by the control door.

The construction of the defrost cavity 35 and the control door 50 further allows for the control door 50 to be configured to variably restrict each of the windshield defrost pathway 41 and the demist pathway 42, although such a feature may not be necessarily required to achieve each desired operating mode of the air handling system 1. Again referring to FIG. 1, the control door 50 may be rotated from the position shown in FIG. 1 in the second rotational direction opposite the first rotational direction (counter-clockwise as shown in FIGS. 1-4) to variably restrict each of the windshield defrost pathway 41 and the demist pathway 42 by bringing the first distal edge 62 progressively closer to the first sidewall 36 while also bringing the second distal edge 63 progressively closer to the second sidewall 37.

The construction of the defrost cavity 35 and the control door 50 as well as the positioning of the control door 50 beneficially allows the air handling system 1 to variably control a flow distribution and pressure of the air flowing to the windshield defrost pathway 41 while concurrently providing a substantially constant flow distribution and pressure of the air flowing to the demist pathway 42 for each of the associated operating modes of the air handling system 1 utilizing the defrost cavity 35. The manner in which the control door 50 is positioned upstream of the partition 45 and to one side of the partition 45 allows for the control door 50 to be rotated in one rotational direction through a range of positions wherein the flow through the windshield defrost pathway 41 is controlled independent of the flow through the demist pathway 42. The control door 50 is further configured to allow for the control door 50 to rotate in an opposite rotational direction to close off the flow through each of the windshield defrost pathway 41 and the demist pathway 42 simultaneously. The control door 50 accordingly solves the problem presented by newer requirements that a greater and more constant percentage of the air originating from the mixing section 22 is distributed to the side window defrost vents, and therefore the demist pathway 42, when the air handling system 1 is operating in an operating mode requiring a defrost function, including but not limited to one of the defrost operating mode, the mixed defrost/floor operating mode, and the floor operating mode.

FIGS. 7-11 illustrate a defrost cavity 135 according to another embodiment of the invention. The defrost cavity 135 may be formed in a conduit 109 used in place of the first conduit 9 of the air handling system 1 illustrated in FIG. 1. However, the defrost cavity 135 may be used in conjunction with any form of air handling system generally including an inlet section 20, a conditioning section 21, and a mixing section 22, wherein the mixing section 22 is formed upstream of the different portions of a delivery section 23 including the defrost cavity 135.

The conduit 109 branches into at least two independent flow paths including at least one windshield defrost pathway 141 and at least one demist pathway 142a, 142b. The embodiment illustrated in FIGS. 7-11 utilizes a single windshield defrost pathway 141 and a pair of demist pathways 142a, 142b formed to lateral sides of the windshield defrost pathway 141, but various other configurations including only a single one of the demist pathways 142a, 142b formed laterally to the windshield defrost pathway 141 may be used without departing from the scope of the present invention. Upstream of the branching of the conduit 109 into the pathways 141, 142a, 142b the entirety of the conduit 109 may be defined by a first sidewall 136, a second sidewall 137 arranged opposite the first sidewall 136, a third sidewall 138, and a fourth sidewall 139 arranged opposite the third sidewall 138. An inlet into the demist pathway 142a is formed by an opening (not shown) in the third sidewall 138 and an inlet into the demist pathway 142b is formed by an opening 143 in the fourth sidewall 139. The demist pathway 142a accordingly extends at least partially in a first lateral direction of the conduit 109 while the demist pathway 142b extends at least partially in a second lateral direction of the conduit 109 opposite the first lateral direction.

Figure 11:
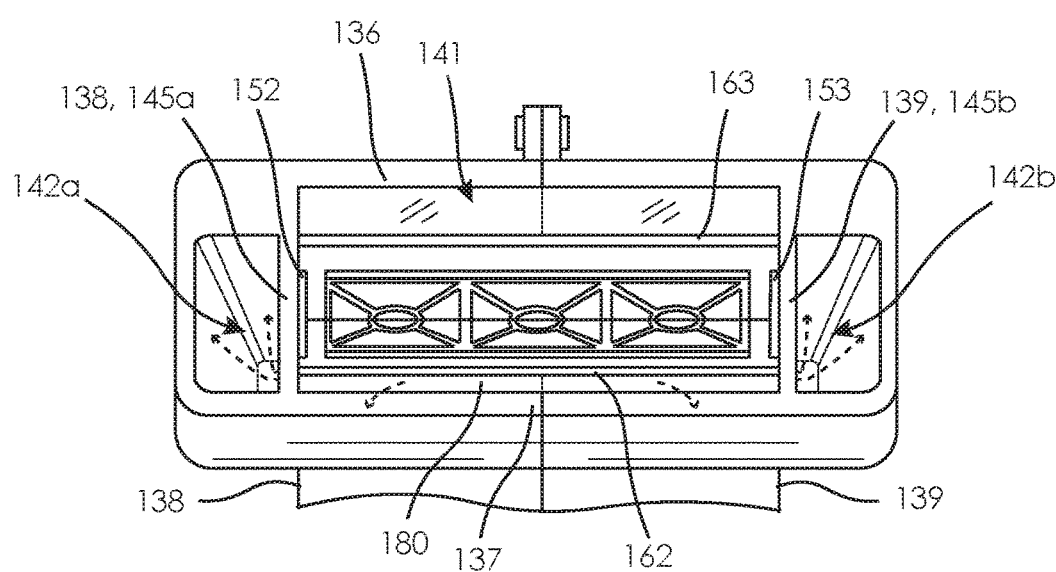
FIG. 11 is a partial perspective view of an outlet of the conduit of FIG. 7 showing a positioning of the control door when operating in the floor operating mode of the air handling system.

As shown in FIG. 11, downstream of the branching of the conduit 109 the third sidewall 138 forms a partition 145a separating the demist pathway 142a from the windshield defrost pathway 141 while the fourth sidewall 139 forms a partition 145b separating the demist pathway 142b from the windshield defrost pathway 141. The demist pathway 142a is accordingly at least partially defined by the partition 145a while the demist pathway 142b is at least partially defined by the partition 145b. The windshield defrost pathway 141 is thereby defined by the first sidewall 136, the second sidewall 137, the third sidewall 138 acting as partition 145a, and the fourth sidewall 139 acting as partition 145b.

A control door 150 is rotatably disposed in the defrost cavity 135 adjacent a branching of the conduit 109 into the windshield defrost pathway 141 and the demist pathways 142a, 142b. The control door 150 includes a shaft 151 or similar structure for forming an axis of rotation of the control door 150. The shaft 151 may include a first shaft portion 152 rotatably coupled to the third sidewall 138 acting as partition 145a and a second shaft portion 153 rotatably coupled to the fourth sidewall 139 acting as partition 145b. However alternative arrangements may be used without departing from the scope of the present invention.

The control door 150 is shown in FIGS. 7-11 as having a dual panel construction oriented at an obtuse angle. The control door 150 includes a first distal edge 162 and an oppositely arranged second distal edge 163 (shown in FIG. 11). The first distal edge 162 forms a distal surface of the control door 150 formed to one side of the axis of rotation thereof while the second distal edge 163 forms a distal surface of the control door 150 formed to a second side of the axis of rotation thereof. The first distal edge 162 and the second distal edge 163 may each extend substantially parallel to the axis of rotation of the control door 150. The first distal edge 162 and the second distal edge 163 may include a sealing surface (not shown) disposed thereon for engaging the walls forming the conduit 109. The sealing surface may be configured to deflect or compress when engaging the corresponding surface of the conduit 109 to allow for the control door 150 to properly seal off a flow of air around the corresponding edge of the control door 150.

Figure 7:
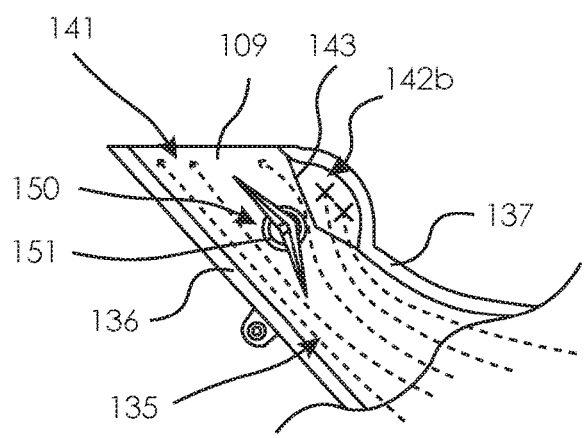
FIG. 7 is an elevational fragmentary view of a conduit and a control door of the air handling system according to another embodiment of the invention wherein the control door is adjusted to a position corresponding to a defrost operating mode of the air handling system.

FIG. 7 illustrates the control door 150 when adjusted to a fully open position corresponding to the defrost operating mode of the air handling system 1. The control door 150 is rotated to a position wherein both the windshield defrost pathway 141 and the demist pathways 142a, 142b are all fully open to allow for a flow of the air from the mixing section 22 to flow to each of the windshield defrost vents and the demist vents of the air handling system 1. The first distal edge 162 and the second distal edge 163 of the control door 150 are each spaced apart from each of the first sidewall 136 and the second sidewall 137. As shown in FIG. 7, the positioning of the control door 150 allows for the demist pathway 142b to be fully open to allow for at least a portion of the air flowing through the conduit 109 to turn in the second lateral direction (wherein flow in the second lateral direction is indicated by an X in FIGS. 7-10) to flow in a direction parallel to the axis of rotation of the control door 150 beyond the partition 145b before turning to again to flow in a direction perpendicular to the axis of rotation of the control door 150 and substantially parallel to the flow of the air through the windshield defrost pathway 141. Because the demist pathways 142a, 142b may be formed to be substantially symmetric, description of the demist pathway 142a, which is not illustrated in FIGS. 7-10, may in some instances be omitted, but it should be understood that operation of the demist pathways 142a, 142b is substantially identical.

Figure 8:
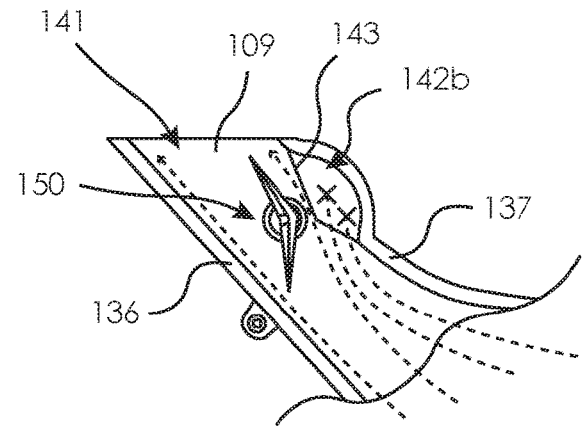
FIG. 8 is an elevational fragmentary view of the conduit and the control door of FIG. 7 wherein the control door is adjusted to a position corresponding to a mixed defrost/floor operating mode of the air handling system.

FIG. 8 illustrates the defrost cavity 135 when the air handling system 1 is operating in the mixed defrost/floor operating mode. The control door 150 is rotated from the position depicted in FIG. 7 about the axis of rotation thereof in the first rotational direction (the clockwise rotational direction from the perspective of FIGS. 7-10). The repositioning of the control door 150 results in the windshield defrost pathway 141 being restricted or lessened in a flow path cross-sectional area when compared to the positioning of the control door 150 shown in FIG. 7, while each of the demist pathways 142a, 142b remain unobstructed following the rotation of the control door 150.

Figure 9:
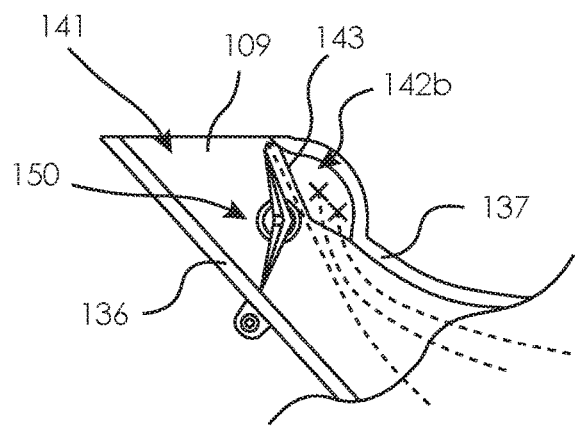
FIG. 9 is an elevational fragmentary view of the conduit and the control door of FIG. 7 wherein the control door is adjusted to a position corresponding to a floor operating mode of the air handling system.

FIGS. 9 and 11 illustrate the defrost cavity 135 when the air handling system 1 is operating in the floor operating mode. The control door 150 is further rotated from the position depicted in FIG. 8 about the axis of rotation thereof in the first rotational direction (clockwise from the perspective of FIGS. 7-10). The second distal edge 163 of the control door 150 contacts the first sidewall 136 following the rotation of the control door 150 resulting in a single flow path formed between the first distal edge 162 and the second sidewall 137, which is labeled in FIG. 11 as gap 180. The flow of the air through the gap 180 may be considered flow in the "bleed condition" wherein a minimized quantity of the air originating from the mixing section 22 is caused to flow through the gap 180 and into the windshield defrost pathway 141. The repositioning of the control door 150 accordingly results in the windshield defrost pathway 141 being restricted or lessened in a flow path cross-sectional area when compared to the position of the control door 150 shown in FIG. 8, while the demist pathways 142a, 142b continue to remain unobstructed by the control door 150.

As shown in FIG. 9, the opening forming the inlet into the demist pathway 142b is formed adjacent a surface of the control door 150 extending from the axis of rotation thereof to the first distal edge 162 thereof. This positioning of the demist pathway 142b relative to the control door 150 advantageously allows for the air encountering the control door 150 to be turned by the control door 150 in both the first lateral direction towards the demist pathway 142a and the second lateral direction towards the demist pathway 142b. Accordingly, when the control door 150 is rotated to restrict flow to the windshield defrost pathway 141, the control door 150 also serves the function of directing the remainder of the flow toward the demist pathways 142a, 142b, whereby acting as a baffle for directing flow to the demist pathways 142a, 142b.

Figure 10:
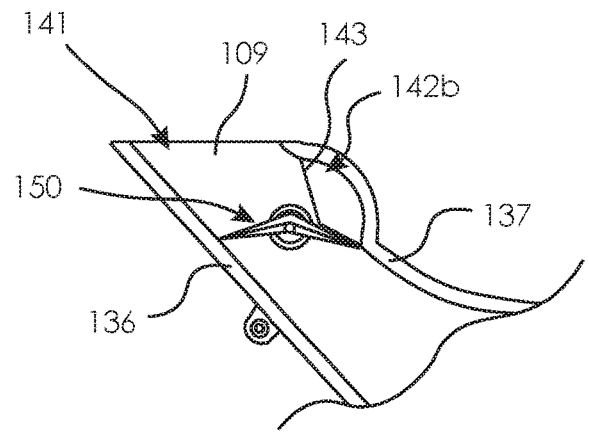
FIG. 10 is an elevational fragmentary view of the conduit and the control door of FIG. 7 wherein the control door is adjusted to a position wherein flow through the conduit is blocked.

FIG. 10 illustrates the defrost cavity 135 when the control door 150 has been rotated to a position closing off flow to each of the windshield defrost pathway 141, the demist pathway 142a, and the demist pathway 142b. The control door 150 is rotated in the second rotational direction opposite the first rotational direction (counter-clockwise as shown in FIGS. 7-10) until the first distal edge 162 engages the first sidewall 136 and the second distal edge 163 engages the second sidewall 137, thereby blocking flow to the defrost cavity 135 in its entirety. The control door 150 in the closed position may correspond to operation of the air handling system 1 in one of a panel operating mode or a bi-level panel/floor operating mode.

The conduit 109 and defrost cavity 135 accordingly provide an alternative configuration for controlling the flow of the air to the windshield defrost vents and the side window defrost vents of the air handling system 1 in comparison to that disclosed in FIGS. 1-6. In the configuration shown in FIGS. 1-6, the control door 50 is used to direct at least a portion of the air flowing through the defrost cavity 35 in a direction perpendicular to the axis of rotation of the control door 50 to direct the air towards the demist pathway 42 which is spaced from the windshield defrost pathway 41 in the direction perpendicular to the axis of rotation. The air accordingly enters the demist pathway 42 while flowing in the direction perpendicular to the axis of rotation of the control door 50. In the configuration shown in FIGS. 7-11, the control door 150 is used to direct at least a portion of the air flowing through the defrost cavity 135 in a lateral direction parallel to the axis of rotation of the control door 150 to direct the air towards the demist pathways 142a, 142b which are spaced from the windshield defrost pathway 141 in the direction parallel to the axis of rotation. The air accordingly must flow at least partially in the lateral direction parallel to the axis of rotation of the control door 150 to enter the inlet into the demist pathways 142a, 142b. The alternative configurations allow for a freedom of design of the air handling system 1 to account for various differing flow configurations of the delivery section 23 of the air handling system 1 as well as to account for various different packaging arrangements that may be formed around to the air handling system 1.

The lateral flow configuration disclosed in FIGS. 7-11 shows the control door 150 as being entirely separated from the demist pathways 142a, 142b by the partitions 145a, 145b, but various other configurations may be used including configurations wherein one or more portions of the control door 150 extend into one or both of the demist pathways 142a, 142b, so long as the control door 150 does not obstruct flow of the air through the demist pathways 142a, 142b during the prescribed operating modes of the air handling system 1.

Figure 12:
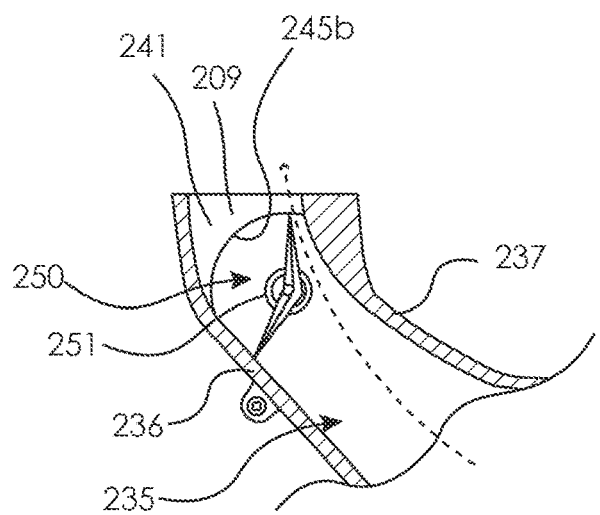
FIG. 12 is a fragmentary sectional view of a conduit having a control door according to another embodiment of the invention as taken through section lines 12-12 of FIG. 14.
Figure 13:
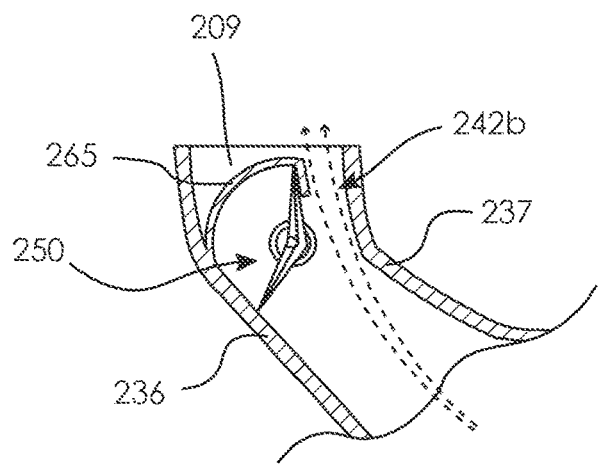
FIG. 13 is a fragmentary sectional view of the conduit and the control door of FIG. 12 as taken through section lines 13-13 of FIG. 14.
Figure 14:
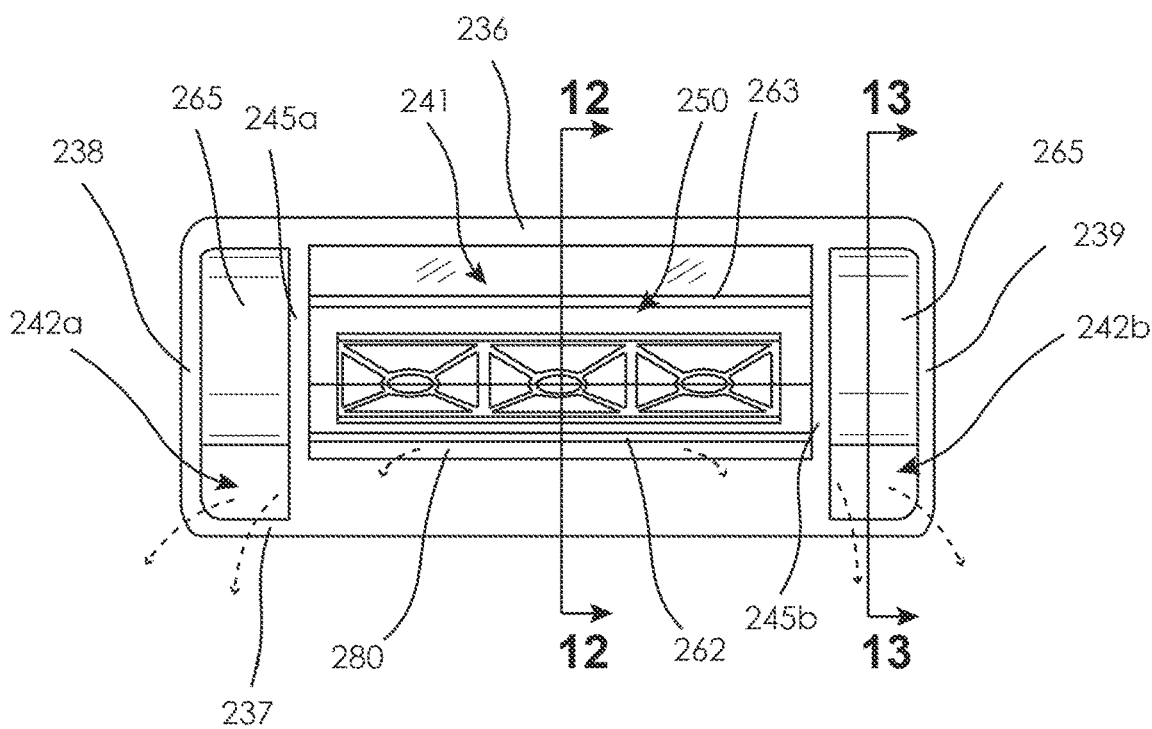
FIG. 14 is a partial perspective view of an outlet of the conduit of FIGS. 12 and 13.

For example, FIGS. 12-14 illustrate a defrost cavity 235 wherein a control door 250 extends at least partially into at least one demist pathway of the air handling system 1 according to another embodiment of the invention. The defrost cavity 235 may be formed in a conduit 209 used in place of the first conduit 9 of the air handling system 1 illustrated in FIG. 1. However, the defrost cavity 235 may be used in conjunction with any form of air handling system generally including an inlet section 20, a conditioning section 21, and a mixing section 22, wherein the mixing section 22 is formed upstream of the different portions of a delivery section 23 including the defrost cavity 235.

The conduit 209 branches into at least two independent flow paths including at least one windshield defrost pathway 241 and at least one demist pathway 242a, 242b. The embodiment illustrated in FIGS. 12-14 utilizes a single windshield defrost pathway 241 and a pair of demist pathways 242a, 142b formed to lateral sides of the windshield defrost pathway 241, but various other configurations including only a single one of the demist pathways 242a, 242b formed laterally to the windshield defrost pathway 241 may be used without departing from the scope of the present invention. Upstream of the branching of the conduit 209 into the pathways 241, 242a, 242b the entirety of the conduit 209 may be defined by a first sidewall 236, a second sidewall 237 arranged opposite the first sidewall 236, a third sidewall 238, and a fourth sidewall 239 arranged opposite the third sidewall 238. A partition 245a and a partition 245b extend between the first sidewall 236 and the second sidewall 237 to divide an outlet end of the conduit 209 into the independent flow paths 241, 242a, 242b. As shown in FIG. 14, the demist pathway 242a is defined by the cooperation of the partition 245a, a portion of the first sidewall 236, a portion of the second sidewall 237, and the third sidewall 238. The demist pathway 242b is defined by the cooperation of the partition 245b, a portion of the first sidewall 236, a portion of the second sidewall 237, and the fourth sidewall 239.

The control door 250 is rotatably disposed in the defrost cavity 235 adjacent a branching of the conduit 209 into the windshield defrost pathway 241 and the demist pathways 242a, 242b. The control door 250 includes a shaft 251 or similar structure for forming an axis of rotation of the control door 250. The shaft 251 may include a first shaft portion (not shown) rotatably coupled to the third sidewall 138 and a second shaft portion (not shown) rotatably coupled to the fourth sidewall 239. However alternative arrangements may be used without departing from the scope of the present invention.

The control door 250 is shown in FIGS. 12-14 as having a dual panel construction oriented at an obtuse angle. The control door 250 includes a first distal edge 262 and an oppositely arranged second distal edge 263. The first distal edge 262 forms a distal surface of the control door 250 formed to one side of the axis of rotation thereof while the second distal edge 263 forms a distal surface of the control door 250 formed to a second side of the axis of rotation thereof. The first distal edge 262 and the second distal edge 263 may each extend substantially parallel to the axis of rotation of the control door 250. The first distal edge 262 and the second distal edge 263 may include a sealing surface (not shown) disposed thereon for engaging the walls forming the conduit 209. The sealing surface may be configured to deflect or compress when engaging the corresponding surface of the conduit 209 to allow for the control door 250 to properly seal off a flow of air around the corresponding edge of the control door 250.

FIGS. 12 and 13 illustrate the defrost cavity 235 when operating in the floor operating mode of the air handling system 1. As explained in the preceding sections, the floor operating mode occurs when the control door 250 is rotated in the first rotational direction (clockwise from the perspective of FIGS. 12 and 13) until the control door 250 can no longer rotate in the first rotational direction due to the second distal edge 263 engaging the first sidewall 237. Accordingly, it should be understood with reference to FIGS. 12 and 13 that rotation of the control door 250 in the second rotational direction away from the position corresponding to the floor operating mode will lead to the control door 250 passing through positions corresponding to the mixed floor/defrost operating mode, the defrost operating mode, and finally the fully closed position wherein the control door 250 has fully rotated in the second rotational direction and the first distal edge 262 is engaging the first sidewall 236 and the second distal edge 263 is engaging the second sidewall 237. Accordingly, illustrations of the alternative operating modes of the defrost cavity 235 have been omitted.

FIG. 12 shows the interior of the conduit 209 along a plane extending through the central windshield defrost pathway 241. The partition 245b is formed immediately downstream of the first distal edge 262 of the control door 250. The air flowing through the central portion of the conduit 209 first encounters the control door 250 before being directed toward a gap 280 formed between the first distal edge 262 and the second sidewall 237. The air flowing through the gap 280 enters the windshield defrost pathway 241 and is directed to the windshield defrost vents of the passenger compartment. The relatively small cross-sectional flow area of the gap 280 causes at least a portion of the air encountering the control door 250 to be redirected in one of a first lateral direction parallel to the axis of rotation of the control door 250 towards the demist pathway 242a and a second lateral direction parallel to the axis of rotation of the control door 250 towards the demist pathway 242b. The laterally directed air is then able to flow past each of the partitions 245a, 245b at a location upstream of the partitions 245a, 245b in order to enter each of the demist pathways 242a, 242b.

FIG. 13 shows the interior of the conduit 209 along a plane extending through the demist pathway 242b. A baffle 265 extends from the first sidewall 236 and is configured to control a flow of the air encountering the baffle 265. As shown in FIG. 13, the second sidewall 237 widens adjacent the baffle 265 to increase a cross-sectional flow area of the demist pathway 242b. When in the floor operating mode, the baffle 265 and the control door 250 cooperate to form a surface opposite the second sidewall 237 for directing the air to the demist pathway 242b.

The defrost cavity 235 accordingly operates using a similar principle to that of the defrost cavity 135 illustrated in FIGS. 7-11 wherein the control door 250 is used to direct at least a portion of the air flowing through the conduit 209 towards lateral portions of the conduit 209 to direct the air to the demist pathways 242a, 242b straddling the windshield defrost pathway 241. The demist pathways 242a, 242b are formed to be widened in a direction extending perpendicular to the axis of rotation of the control door 250 in contrast to the configuration shown in FIGS. 7-11 wherein the demist pathways 142a, 142b are widened in the direction extending parallel to the axis of rotation of the control door 250. The control door 250 accordingly allows for the windshield defrost pathway 241 to be variably restricted by rotation of the control door 250 while the demist pathways 242*a*, 242*b* remain unobstructed.

Accordingly, from the foregoing description, one ordinarily skilled in the art can easily ascertain the essential characteristics of this invention and, without departing from the spirit and scope thereof, can make various changes and modifications to the invention to adapt it to various usages and conditions.

What is claimed is:

1. An air handling system for a heating, ventilation, and air conditioning system of a motor vehicle having a passenger compartment, the air handling system comprising:
    a conduit having a flow of air passing therethrough, the conduit including a partition dividing the conduit into a first pathway and a second pathway; and
    a control door disposed in the conduit and rotatably adjustable between a first position wherein the first pathway and the second pathway are each fully open and a second position wherein a flow area through the first pathway is at least partially restricted and the second pathway is fully open, wherein the control door is rotatably adjustable to a third position wherein the control door blocks the flow of the air through each of the first pathway and the second pathway, and wherein rotation of the control door from the first position to the second position occurs in a first rotational direction and rotation of the control door from the second position to the third position occurs in a second rotational direction opposite the first rotational direction.

2. The air handling system of claim 1, wherein the control door includes a first edge, an oppositely arranged second edge, and an axis of rotation between the first edge and the second edge.

3. The air handling system of claim 2, wherein the first pathway is formed between a first wall and the partition and the second pathway is formed between a second wall and the partition, the first wall formed opposite the second wall, wherein the first edge and the second edge of the control door are spaced from each of the first wall and the second wall in the first position, and wherein the first edge is spaced from the partition and the second edge engages the first wall in the second position.

4. The air handling system of claim 2, wherein the first pathway is formed between a first wall and an oppositely arranged second wall, wherein the first edge and the second edge of the control door are spaced from each of the first wall and the second wall in the first position, and wherein the first edge is spaced from the second wall and the second edge engages the first wall in the second position.

5. The air handling system of claim 2, wherein the air enters the second pathway while flowing in a direction perpendicular to the axis of rotation of the control door.

6. The air handling system of claim 2, wherein the air enters the second pathway while flowing in a direction parallel to the axis of rotation of the control door.

7. The air handling system of claim 1, wherein the conduit includes a first wall and an oppositely arranged second wall upstream of the partition, and wherein a first edge of the control door engages the first wall and an oppositely arranged second edge of the control door engages the second wall in the third position.

* * * * *